UNITED STATES PATENT OFFICE.

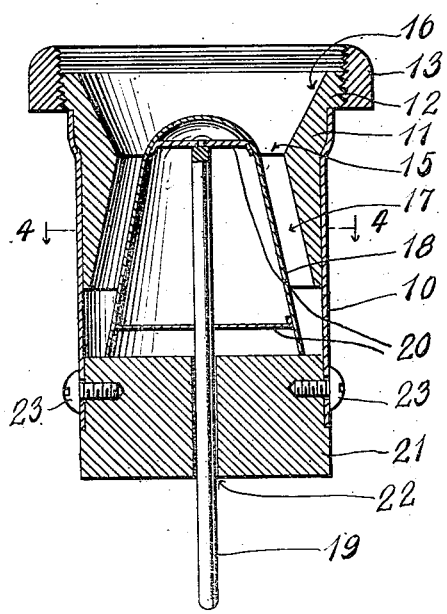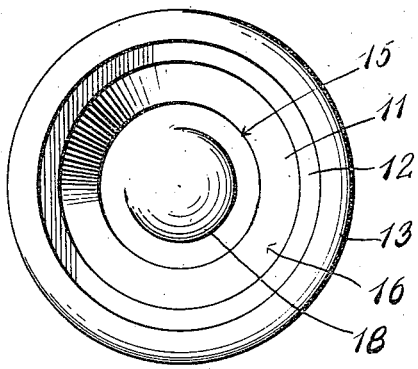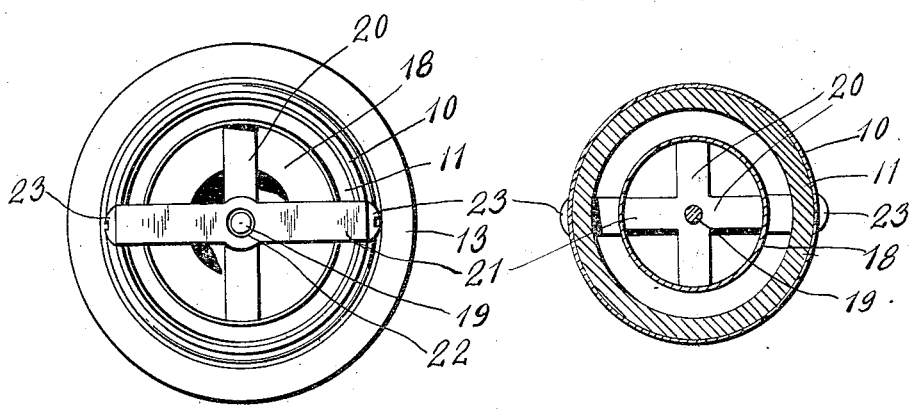

JACOB DOME, OF YORK, PENNSYLVANIA.

CHECK VALVE.

1,421,184. Specification of Letters Patent. Patented June 27, 1922.

Application filed November 2, 1920. Serial No. 421,295.

*To all whom it may concern:*

Be it known that I, JACOB DOME, a citizen of the United States of America, residing at York, in the county of York and State of Pennsylvania, have invented new and useful Improvements in Check Valves, of which the following is a specification.

This invention relates to valves for use in sewers, drain pipes and the like, and has for an object the provision of a check valve which is simple in construction and positive in operation and which may be easily and quickly removed for purposes of cleaning and repair.

Another object is the provision of a novel form of check valve which includes a casing having an annular oppositely flared member which provides a flared entrance and a tapered side for a tapered valve member, the latter being of hollow formation and open at its large end to present an obstruction to the flow of liquid through the valve in one direction.

With the above and other objects in view, the invention further includes the following novel features and details of construction, to be hereinafter more fully described, illustrated in the accompanying drawings and pointed out in the appended claim.

In the drawings:

Figure 1 is a central longitudinal sectional view through a valve embodying the invention.

Figure 2 is a plan view of the valve.

Figure 3 is a view looking at the opposite end.

Figure 4 is a section on the line 4—4 of Figure 1.

Referring to the drawings in detail, wherein like characters of reference denote corresponding parts, the reference character 10 indicates a casing which is preferably cylindrical in form and has secured in one end a member 11 which extends beyond the end of the casing 10 and is provided with a threaded flange 12, the shoulder of which abuts the end of the casing. This threaded flange is adapted for removable engagement with an internally threaded collar 13 which is designed to be secured in any preferred manner to a stationary member for the purpose of removably securing the valve in position.

The member 11 is provided with a restricted opening 15 and is flared in opposite directions as indicated at 16 and 17, the former providing a flared entrance mouth through which liquid passing into the valve will enter. The flared portion 17 provides a tapered seat which is designed to be engaged by a valve member 18.

This valve member is of tapered or conical formation and is hollow, being rounded at its upper end. Secured within this valve member and projecting outwardly from its large end is a valve stem 19, cross bars or spiders 20 serving as a means for securing the stem to the valve.

Secured within the end of the valve opposite the flared mouth 16 is a relatively thick cross bar 21 which is provided with an opening 22 for the passage of the valve stem 19 for the purpose of guiding the valve in its movement. The bar 21 is removably secured to the casing 10 by means of screws 23 and in addition to serving as a guide for the stem of the valve also provides a stop for limiting the movement of the valve in one direction.

From the foregoing it will be seen that liquid entering the valve through the flared mouth 16 will force the valve against the bar 21 to an open position and permit of the free passage of the liquid therethrough. Any backflow of the liquid will immediately seat the valve upon the tapered seat 17 as will be apparent from the drawings so that backflow through the valve will be prevented.

The invention is susceptible of various changes in its form, proportions and minor details of construction and the right is herein reserved to make such changes as properly fall within the scope of the appended claim.

Having described the invention what is claimed is:—

A device of the class described comprising a cylindrical casing, a circular member secured to said casing having a restricted opening and provided with outwardly flared ends, a threaded annular flange extending from the upper end of said member and having a shoulder abutting the upper end of said casing, an interiorly threaded collar engaging said threaded annular flange, a relatively thick cross bar removably secured to said casing at the lower end thereof and provided with a vertical opening, a hollow frusto-conical shaped valve member engaging said bar and provided with a rounded upper end, and a valve stem secured to said valve member and extending through the opening in said bar.

In testimony whereof I affix my signature.

JACOB DOME.